United States Patent [19]
Jeong

[11] Patent Number: 5,743,465
[45] Date of Patent: Apr. 28, 1998

[54] METHODS AND APPARATUS FOR EFFECTING WIRELESS CONTROL OF AN AIR CONDITONER

[75] Inventor: Sang-Jin Jeong, Suwon, Rep. of Korea

[73] Assignee: Samsung Electronics Co., Ltd., Suwon, Rep. of Korea

[21] Appl. No.: 698,656

[22] Filed: Aug. 16, 1996

[30] Foreign Application Priority Data

Aug. 22, 1995 [KR] Rep. of Korea .................. 95-25963

[51] Int. Cl.$^6$ .................................................. G05D 23/19
[52] U.S. Cl. ................................ 236/51; 236/94; 62/127
[58] Field of Search .......................... 62/127, 129, 126, 62/186, 176.6; 236/44 C, 51, 94

[56] References Cited

U.S. PATENT DOCUMENTS

| | | | |
|---|---|---|---|
| 5,097,671 | 3/1992 | Jeong-Hun | 236/51 X |
| 5,326,027 | 7/1994 | Sulfstede | 236/51 |
| 5,428,964 | 7/1995 | Lobdell | 236/94 X |

Primary Examiner—Harry B. Tanner
Attorney, Agent, or Firm—Burns, Doane, Swecker & Mathis, L.L.P.

[57] ABSTRACT

An air conditioner includes a control device and a control method for transmitting and receiving wireless signals between a main control unit and a control selector of the air conditioner. A display unit displays room temperature, room humidity and air flow speed sensed by sensing devices.

1 Claim, 2 Drawing Sheets

METHODS AND APPARATUS FOR EFFECTING WIRELESS CONTROL OF AN AIR CONDITONER

BACKGROUND OF THE INVENTION

1. Field of the Invention

The present invention relates to an air conditioner, and more particularly to a control device method for operating an air conditioner.

2. Description of the Prior Art

A conventional air conditioner has, as shown in FIG. 1, a construction in that a main control unit 10 is connected to a sub control unit 20 through electrical wires A, B and C.

The main control unit 10 is also connected to another sub control unit (not shown) through the electrical wire B so that a signal from the main control unit 10 may be sent to the sub control unit 20, and vice versa.

That is, the main control unit 10 is connected to a display unit 21 of the sub control unit 20 through the electrical wire C so that a control signal from the main control unit 10 is sent to the sub control unit 20. Furthermore, the main control unit 10 is connected to an input unit 23 of the sub control unit 20 through the electrical wire A so that a signal inputted to the input unit from the other control unit is sent to the main control unit 10 through the electrical wire A.

Further, the main control unit 10 is connected to a connection between the display unit 21 and the input unit 23 of the sub control unit 20 through the electrical wire B, thereby controlling the display unit 21 and the input unit 23.

Meanwhile, the input unit 23 of the sub control unit 20 serves to input data necessary for an operation of the air conditioner to the main control unit 10. Therefore, the input unit 23 includes a plurality of switches or keys.

Furthermore, the display unit 21 served to display an operation state of the air conditioner, such as current room temperature changing according to the operation of the air conditioner. Therefore, the display unit 21 includes a light emitting diode or a liquid crystal display.

However, the conventional air conditioner having the above construction has a disadvantage in that there are many connections between the main control unit 10 and the sub control unit 20 through the electrical wires, thereby causing the cost to be high and causing a noise to be generated on the electrical wires. That is, it is a possibility that the air conditioner is, in error, operated due to the noise on the electrical wires.

Another conventional air conditioner has been disclosed in the Japanese Patent Laid-open publication pyung 4-187934.

A control device for an air conditioner disclosed in pyung 4-187934 comprises an air conditioner body, and a telephone including means for interpretating and recognizing an audio signal being inputted to the body through a telephone circuit or by wireless, and means for outputting an audio mixing signal in accordance with the audio signal, thereby executing communication with an operator.

The control device for the air conditioner further includes means for separating the audio signal from noise and for outputting the audio signal to the telephone, means for exchanging circuit according to use the telephone, means for transmitting a signal to the body by wireless, thereby controlling the air conditioner, and means for receiving a signal outputted from the body by wireless, and for determining what the wireless signal is.

The air conditioner having the above construction has an advantage that the air conditioner may be operated by a control signal generated from the telephone, thereby preventing noise from being generated.

Therefore, it is possible to enhance the performance of the air conditioner.

The above-described air conditioner, however, has a disadvantage in that not only the circuit must be exchanged according to use of the telephone but also the construction is complicated, thereby raising the manufacturing cost.

SUMMARY OF THE INVENTION

It is, therefore, an object of the present invention to provide an improved control device for an air conditioner and a control method thereof in which the above problems can be overcome and which prevents a noise from being generated while a signal from a main control unit is transmitted to a sub control unit by wireless and vice versa.

In order to accomplish the above object, a control device for an air conditioner in accordance with an embodiment of the present invention provides an air conditioner comprising main control means for controlling an overall operation of the air conditioner, and sub control means for inputting data necessary for an operation of the air conditioner, and for displaying a current operation state of the air conditioner under a control of the main control means, the control device comprising a first module including transmitting means for transmitting a control signal from the main control means to the sub control means by wireless, and receiving means for receiving the control signal outputted from the main control means by wireless; and a second module including transmitting means for transmitting a signal from the sub control means to the main control means by wireless, and receiving means for receiving the signal outputted from the sub control means by wireless.

A control method for an air conditioner comprises the steps of: initializing the air conditioner operation; establishing operation data necessary for an operation of the air conditioner; operating the air conditioner in accordance with the operation data; determining a room current temperature, room humidity, and the speed of discharged air during the operation of the air conditioner; and displaying the room temperature, sensed room humidity and air speed.

BRIEF DESCRIPTION OF THE INVENTION

The above and other objects, features and advantages of the present invention will be more clearly understood from the following detailed description taken in conjunction with the accompanying drawings, in which.

DESCRIPTION OF THE PREFERRED EMBODIMENT

Figure 1:
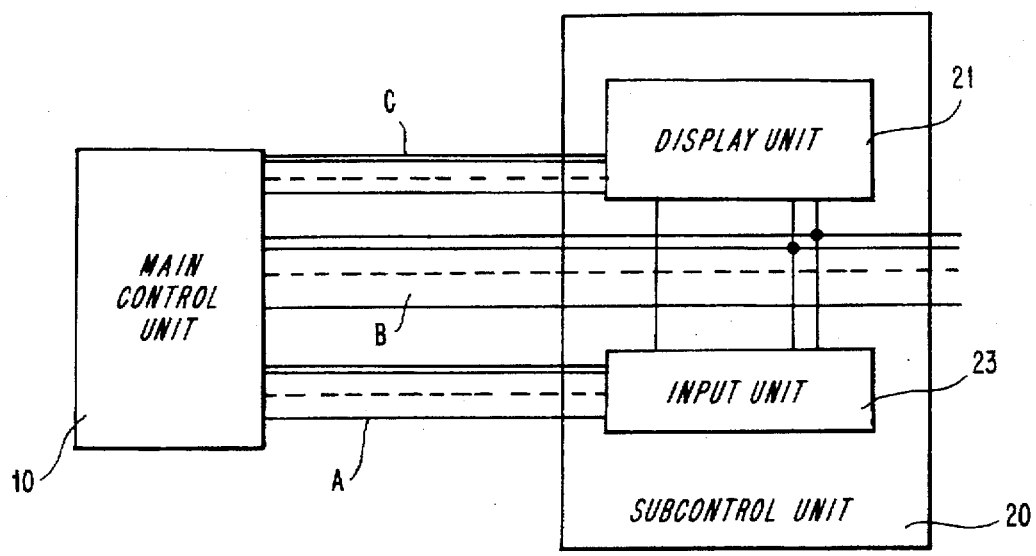
FIG. 1 is a block diagram showing the relationship between a main control unit and a sub control unit in accordance with a air conditioner.
Figure 2:
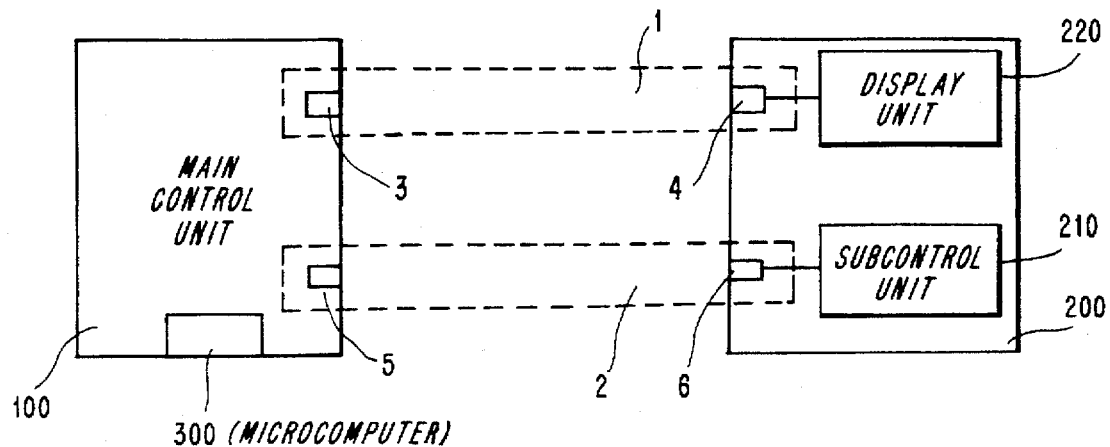
FIG. 2 is a block diagram showing the relationship between a main control unit and a sub control unit in accordance with the present invention.

FIG. 2 is a block diagram showing the connection relationship between a main control unit and a sub control unit in accordance with the present invention.

As shown in FIG. 2, a control device for an air conditioner comprises a first module 1 and a second module 2, for performing transmitting and receiving operations between a main control unit 100 and a sub control unit 200 by wireless.

The first module 1 includes a transmitter 3 provided in the main control unit 100, for transmitting a signal from the main control unit 100 to the sub control unit 200 by wireless, and a receiver 4 provided in the sub control unit 200, for receiving the signal outputted from the transmitter 3 of the main control unit 100 by wireless.

The second module 2 includes a transmitter 6 provided in the sub control unit 200, for transmitting a signal or a switch state being inputted from the sub control unit 200 to the main control unit 100 by wireless, and a receiver 5 provided in the main control unit 100, for receiving the signal outputted from the transmitter 6 of the sub control unit 200 by wireless.

Reference number 300 is a microcomputer provided in the main control unit 100.

The control method of the air conditioner having the above construction will now be described in detail with reference to FIG. 3.

Figure 3:
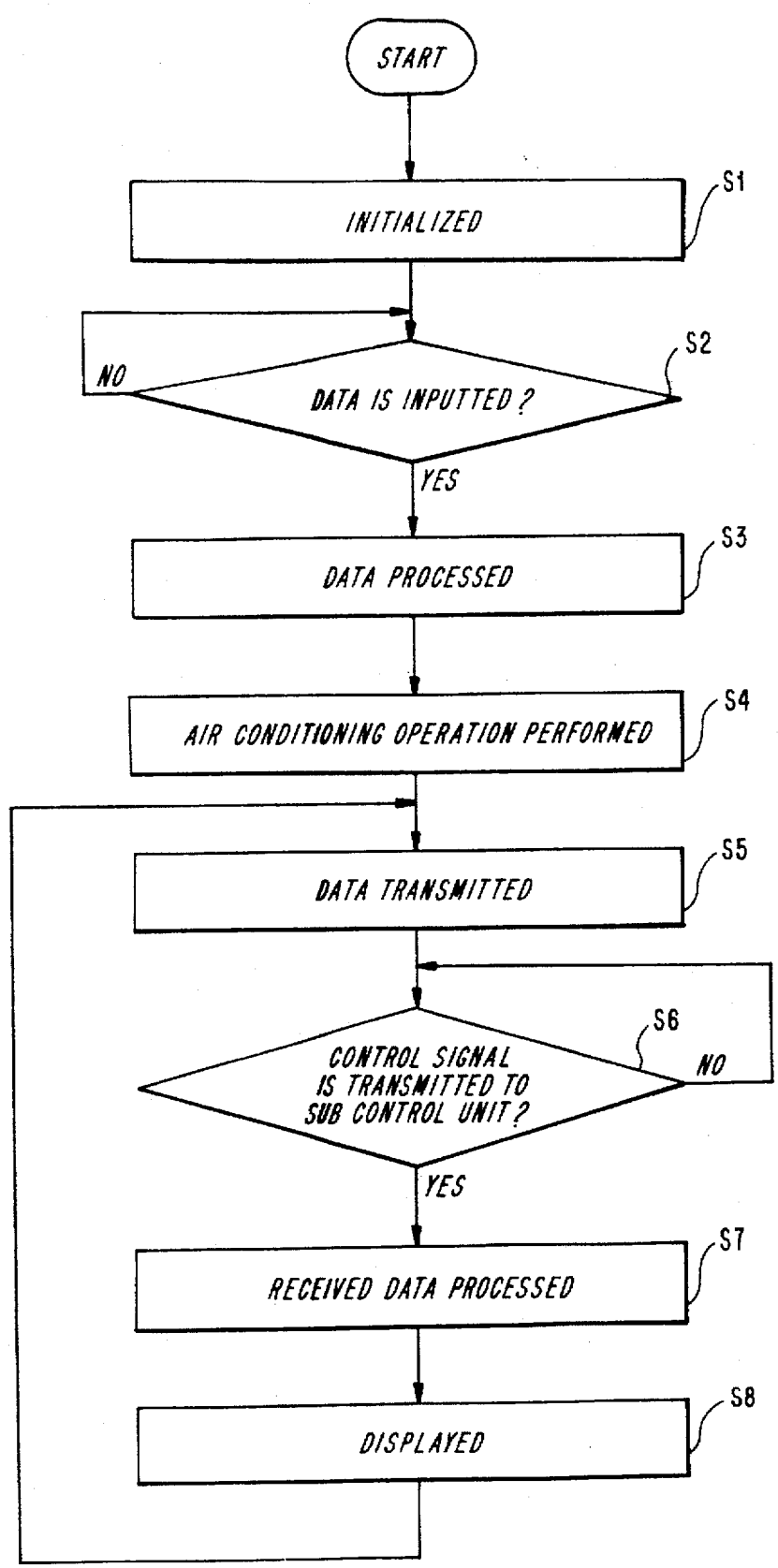
FIG. 3 is a flow chart showing the operation procedure of a control device in accordance with the present invention.

FIG. 3 is a flow chart showing the procedure sequence of the control device in accordance with the present invention.

Once the air conditioner is powered, a DC power supply means (not shown) converts a source voltage received from a commercial AC power source at its AC power input stage (not shown) into a DC voltage with a voltage level required to drive the air conditioner.

The DC voltage from the DC power supply means is then applied to the main control unit 100 as well as various driving circuits.

Upon receiving the DC voltage from the DC power supply means, the main control unit 100 initializes the air conditioner at step S1.

At step S2, data corresponding to temperature, humidity and amount of wind necessary for an operation of the air conditioner is inputted by the input unit 210 of the sub control unit 200 according to a user's desire.

It is then determined by the main control unit 100 at step S2 whether or not the data necessary for the operation of the air conditioner has been inputted to the input unit 210 of the sub control unit 200. As a result, when the data has been inputted to the input unit 210 (namely, if YES), the procedure proceeds to step S3.

At step S3, the data from the input unit 210 is transmitted to the receiver 5 of the main control unit 100 from the transmitter 6 of the sub control unit 200.

In accordance with the data from the input unit 210 of the sub control unit 200 a room temperature, a room humidity and the amount of the wind to be discharged from the air conditioner to the room by the user's desire are determined by the microcomputer 300.

Subsequently, the air conditioner is operated on the basis of the determination result at step S4.

Thereafter, sensing means (not shown) senses the current room temperature, room humidity and the amount of the wind being discharged from the air conditioner to the room.

The sensed data from the sensing means is sent to the microcomputer 300 at step S5.

The microcomputer 13 generates a control signal thereby displaying the sensed current room temperature, humidity, and the amount of the wind (air speed) on the display unit 220.

The control signal generated by the microcomputer 300 is transmitted to the receiver 4 of the sub control unit 200 from the transmitter 3 of the main control unit 100 by wireless.

Next, the procedure proceeds to step S6.

At step S6, it is determined whether or not the control signal from the transmitter 3 of the main control unit 100 has been transmitted to the receiver 4 of the sub control unit 200.

As a result, when the control signal has been transmitted to the receiver 4 of the sub control unit 200 (namely, if YES), the procedure proceeds to step S7.

At step S7, the sub control unit 200 processes the control signal outputted from the transmitter 3 of the main control unit 100 by wireless.

Subsequently, in accordance with the control signal, the display unit 220 of the sub control unit 200 displays the temperature, the humidity, and the amount of the wind to enable the user to confirm those selected parameters.

Thereafter, the procedure returns to step S5 and repeatedly executes the procedure from step S5.

Meanwhile, if the data necessary for the operation of the air conditioner is determined at step S2 as not having been inputted to the input unit 210 of the sub control unit 200 (namely, if NO), the procedure keeps to standby state until the data is inputted to the input unit 210 of the sub control unit 200.

Further, when the control signal outputted from the transmitter 3 of the main control unit 100 is determined at step S6 as not having been transmitted to the receiver 4 of the sub control unit 200 (namely, if NO), the procedure maintains a standby state until the control signal is transmitted to the receiver 4 of the sub control unit 200.

As is apparent from the foregoing description, the present invention provides a control device for an air conditioner and a control method thereof, capable of preventing noise from being generated, thereby enhancing the performance of the air conditioner since a signal from a main control unit is transmitted to a sub control unit by wireless and vice versa.

Having described specific preferred embodiment of the invention with reference to the accompanying drawings, it is to be understood that various changes and modifications may be effected therein by one skilled in the art without departing from the scope or spirit of the invention as defined in the appended claims.

What is claimed is:

1. A method of controlling an operation of a room air conditioner which includes a variable speed fan, the method comprising the steps of:

A) manually inputting into a sub-control means, desired operating conditions, including desired room temperature, desired room humidity and desired fan speed;

B) transmitting the desired operating conditions by wireless from a transmitter on the sub-control means to a receiver on a main control means;

C) causing the main control means to operate the air conditioner in accordance with the desired operating conditions;

D) determining actual operating conditions including actual room temperature, actual room humidity and actual fan speed;

E) transmitting the actual operating conditions by wireless from a transmitter on the main control means to a receiver on the sub-control means; and F) displaying the actual room temperature, actual room humidity and actual fan speed on a display disposed on the sub-control means.

* * * * *